Feb. 18, 1958 Y. BEERS 2,824,280
RECTANGULAR TRANSMISSION LINE ABSORPTION CELL
Filed Aug. 16, 1954 2 Sheets-Sheet 2

INVENTOR.
YARDLEY BEERS
BY
ATTORNEYS

United States Patent Office 2,824,280
Patented Feb. 18, 1958

2,824,280

RECTANGULAR TRANSMISSION LINE ABSORPTION CELL

Yardley Beers, Bronx, N. Y., assignor, by mesne assignments, to the United States of America as represented by the Secretary of the Navy Application August 16, 1954, Serial No. 450,283

9 Claims. (Cl. 324—58.5)

The present invention relates to microwave spectroscopy and more particularly to a method and apparatus for observing absorption spectra of gases at microwave frequencies below the X-band range.

Conventional Stark-modulated waveguide spectrometers have been operated at microwave frequencies as low as 2000 megacycles per second (mc./s.). However, at frequencies below 2000 mc./s. the absorption cell employed in such spectrometers will not function properly. This is apparent for the reason that such cell is operated as a wave guide in a $TE_{01}$ mode having a cut-off frequency of 2000 mc./s. In order to permit observations at frequencies below cut-off it is necessary to increase the physical size of the cell by increasing its cross section.

It is an object of this invention to provide a method and means for adapting conventional Stark-modulated absorption cells for operation below 2000 mc./s. without increasing their physical size.

Another object of the invention is to operate a conventional absorption cell as a parallel-plate transmission line in TEM mode.

Other objects and many of the attendant advantages of this invention will be readily appreciated as the same becomes better understood by reference to the following detailed description when considered in connection with the accompanying drawings wherein.

In spectroscopy, it is customary to utilize the Stark effect to improve the sensitivity and discrimination of the waveguide absorption cell against spurious responses when investigating absorption spectra of gases in the microwave range. One method previously described by R. H. Hughes and E. B. Wilson appeared in the Physical Review, vol. 71 (1947), on page 562, and comprised the use of a radio-frequency Stark effect field that modulates the absorption by the gas under investigation so that a radio receiver can be employed for detecting purposes. As mentioned hereinbefore, the absorption cell is normally operated as a waveguide in a $TE_{01}$ mode and has a cut-off frequency of 2000 mc./s., thereby limiting its use at lower microwave frequencies. As will be hereinafter described, the range of the apparatus can easily be extended by operating the absorption cell as a transmission line in a TEM mode to frequencies below 300 mc./s.

Figure 1:
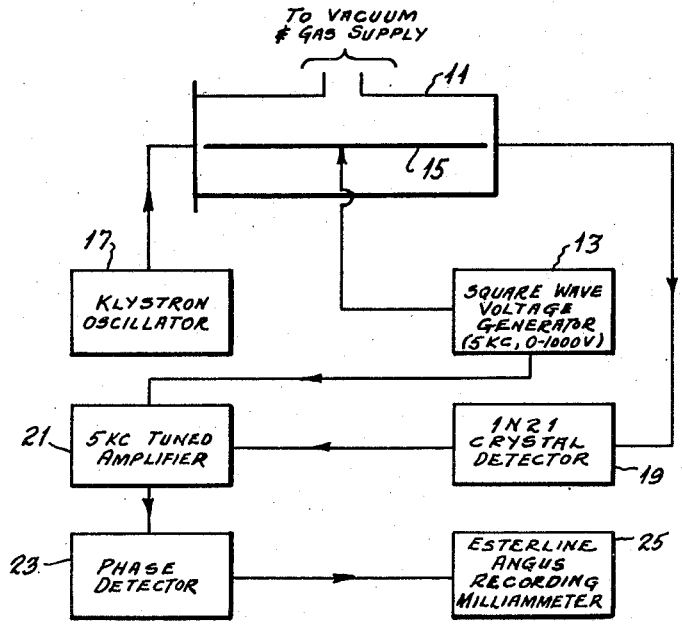
Fig. 1 is a block diagram of a conventional spectrometer employing an S-band wave-guide absorption cell.

In Fig. 1 there is shown in diagrammatic form a spectrometer of conventional design employing a rectangular S-band waveguide absorption cell 11 with square wave Stark modulation. With the exception of absorption cell 11 which consists of a 1½ inch by 3 inch by 20 foot wave-guide and is operated in a $TE_{01}$ mode, all the radio frequency circuitry uses flexible coaxial lines for connections. A square-wave generator 13 supplies the Stark voltage having a frequency of 5000 cycles per second (C. P. S.) to a septum 15 of cell 11 while R.-F. power is fed to one end of cell 11 by a klystron oscillator 17. The R.-F. output is detected by a wave-guide crystal detector 19, amplified and detected by amplifier and detector stages 21 and 23, respectively, and recorded by an Esterline-Angus recording milliammeter 25. Because klystron oscillators, square-wave generators, amplifiers and phase-detecting circuits are well known in the electronics art, no detailed circuitry need be shown or described.

Figure 2:
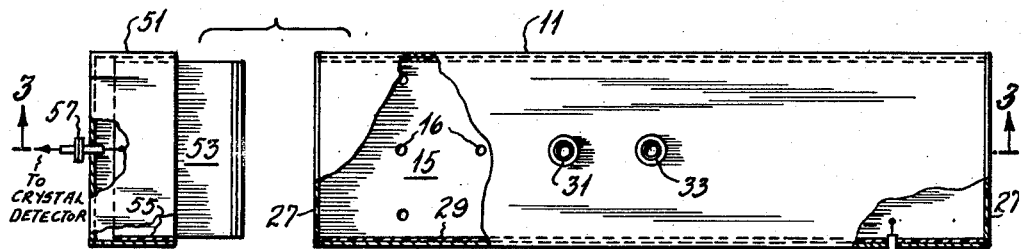
Fig. 2 is a plan view partially schematic and partially in section of the absorption cell of Fig. 1 including the modification of said cell for operation below 2000 mc./s.
Figure 3:
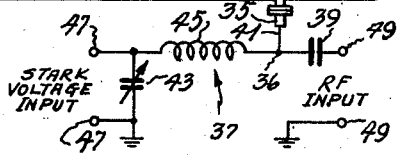
Fig. 3 is an elevational view in section of the invention taken along line 3—3 of Fig. 2.
Figure 3:
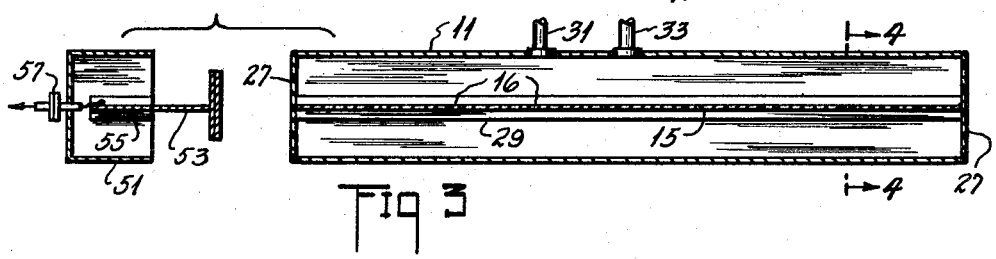

To enable cell 11 to function at frequencies below 2000 mc./s. without changing its physical size, the operation of said cell must be changed from a $TE_{01}$ to a TEM mode. To accomplish this, cell 11 is operated as a parallel-plate transmission line. The cell 11 consists of a copper or brass wave-guide of uniform rectangular cross-section and contains a centrally located Stark electrode or septum 15 made of 1/16″ copper with small holes 16 drilled therein to assist in evacuation. At each end of cell 11 are mica windows 27 which are wax sealed to the ends of the guide to make the guide airtight. Electrode 15 is insulated from the inner walls or sheaths of the guide by polystyrene strips 29. While a thin strip of polystyrene is shown in the drawings, in an alternate construction the polystyrene strip 15 can conform to the entire height of the side wall of cell 11, said strip having a slot along its center to support septum 15. Two pipes 31 and 33 soldered to the cell are suitably mounted thereon for evacuating the cell and supplying the gas to be analyzed thereto (see Figs. 2 and 3).

Mounted on a vertical wall of cell 11 approximately 4 inches from one end thereof (the sending end) is a coaxial connector 35, the inner conductor of which is suitably connected to electrode 15 by means of solder. Said connector is insulated from the wave guide. While connector 35 is shown mounted above septum 15, for optimum efficiency, connector 35 should be located in the same plane with septum 15. A decoupling network 37 consisting of an R.-F. choke 45 in series with a by-pass capacitor 43, and a blocking capacitor 39 is connected to connector 35 at point 36 by means of a flexible coaxial cable 41. Capacitor 43, one end of which is connected to inductance 45, is terminated by ground. Stark voltage is applied to terminals 47 which are connected across capacitor 43 while R.-F. power is applied to terminals 49 connected to capacitor 39 and ground.

At the receiving end of cell 11 is an adapter 51 for capacitive coupling to Stark electrode 15 through mica window 27. Said adapter consists of a small section of open-ended wave-guide having the same cross-sectional area of cell 11 and a T-shaped brass probe element 53, the vertical portion of the T being centrally mounted within the wave-guide section and insulated therefrom by polystyrene strips 55. Mounted on the closed end of adapter 51 and insulated therefrom is a coaxial connector 57, the inner conductor of which is soldered to probe 53. Adapter 51 is supported from cell 11 by a metal sleeve (not shown) similar to sleeve 81 of Fig. 6, for preversing the electrical continuity of the outer conductor of cell 11 and adapter 51.

*Operation*

Figure 5:
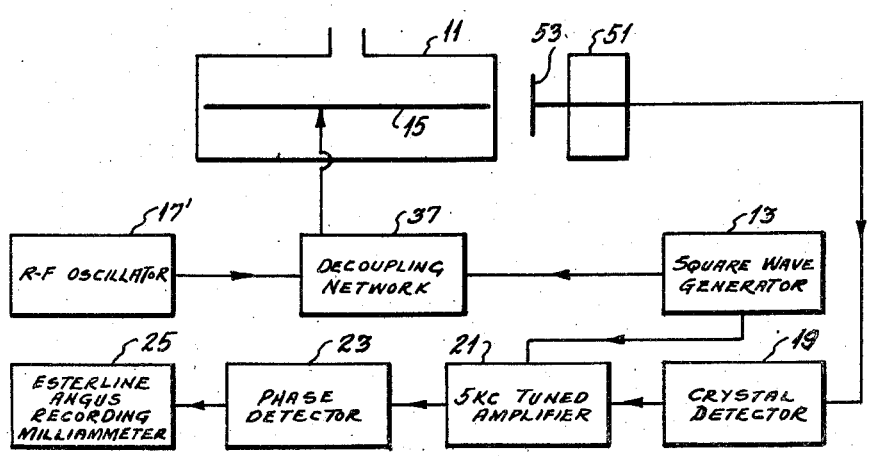
Fig. 5 is a block diagram of a spectrometer employing the invention of Figs. 2, 3 and 4.

Cell 11 is evacuated and the gas to be analyzed is fed into the wave guide. Stark modulating voltage is applied to terminals 47 of decoupling network 37 from a square wave generator 13 operating at a frequency of 5 kilocycles and having a variable voltage input of from 0 to 1000 volts, while R.-F. power is supplied from oscillator 17' to terminals 49 of network 37 (see Figs. 2 and 5). One oscillator found satisfactory for use in the lower microwave frequency range consisted of a 6AF4 triode in a Mallory TV–101 television converter. Adapter 51 is moved toward cell 11 until probe element 53 is almost abutting mica window 27 thereby effecting a capacitive coupling between said probe and cell 11. The R.-F. output is picked up by adapter 51 and fed to crystal detector 19 through an impedance matching network (not shown) consisting of standard S-band double stud tuner assisted by male-to-male and female-to-female coaxial adapters that act as line stretchers. The detected signal is then amplified, detected and recorded in a like manner as in the conventional system of Fig. 1.

Because of the narrow band width of the R.-F. system, an unconventional procedure is employed in searching for absorption spectra lines of gases. The R.-F. oscillator 17' is tuned to a frequency near to where the line is expected, and then, with the frequency fixed, the Stark voltage of generator 13 is swept causing the Stark components to be brought one by one onto the frequency of operation. The process is then repeated at several other R.-F. frequencies in the same general range. From the data consisting of the frequencies and corresponding voltages an approximate value of the frequency of the unsplit line is found by extrapolation. Then the system is tuned to the extrapolated frequency, and, with the Stark voltage maintained constant, the frequency is swept by applying a motor drive (not shown) to the tuning control of oscillator 17' until the line is found.

Figure 6:
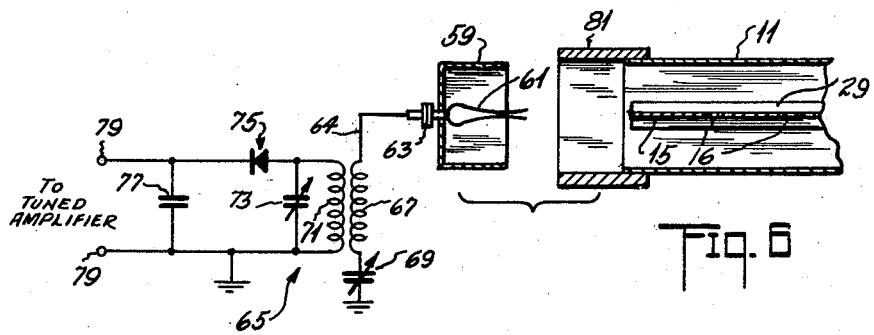
Fig. 6 is an elevational view in section of an alternate form of the invention of Fig. 2.
Figure 4:
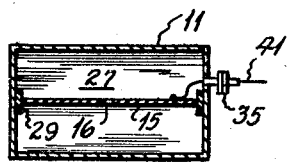
Fig. 4 is a cross-sectional elevational view of the invention taken along lines 4—4 of Fig. 3.

In Fig. 6 there is shown an alternate form of the invention. Instead of capacity coupling between probe 53 of adapter 51 and electrode 15, adapter 59 is directly connected to electrode 15. Said adapter 59 consists of a small section of open-ended wave guide having the same cross-sectional area of cell 11 with a hairpin-shaped spring clip 61 centrally located therein and insulated therefrom. Mounted on the closed end of adapter 59 is a coaxial connector 63 similar to connector 57 of adapter 51, the inner conductor of which is soldered to clip 61.

An impedance matching network 65 is connected to connector 63 by means of coaxial cable 64 and comprises a double-tuned circuit having lumped constant parameters. The primary section of matching network 65 consists of an inductance 67 in series with a variable capacitor 69 to ground and is series-tuned to prevent short-circuiting the Stark voltage. The secondary section is parallel-tuned to provide a D.-C. return for the crystal detector and consists of inductance 71, coupled to inductance 67, in parallel with variable capacitor 73. A detector 75 is in series with said parallel secondary section and variable capacitor 77 is in parallel therewith. The detected signal appears at output terminals 79 across capacitor 77 to ground.

Adapter 59 is designed to abut the receiving end of cell 11 with the mica window 27 removed and spring clip 61 secures to electrode 15. A flange 81 can be mounted on cell 11 for proper alignment of the adapter to the cell and also to prevent escape of gas therefrom. Connector 63 should also present a vacuum seal to adapter 59. Operation of the spectrometer is exactly the same as discussed hereinbefore.

From the foregoing description it is seen that a method and apparatus have been designed for adapting a conventional Stark modulated absorption cell for operation below 200 mc./s. without physically modifying the conventional cell. While particular embodiments of the invention have been shown and described herein, it is not intended that the invention be limited to such disclosures, but that changes and modifications can be made and incorported within the scope of the claims.

What is claimed:

1. A method for analyzing absorption spectra of gases at microwave frequencies comprising the steps of introducing a gas into a fluid-tight rectangular wave guide having an electrode therein, jointly applying an ultra-high-frequency signal and a Stark modulation voltage to such electrode, and, detecting the resulting modulated radio frequency.

2. A method for analyzing absorption spectra of gases at microwave frequencies below 2000 mc./s. comprising the steps of introducing a gas to be analyzed into a fluid-tight rectangular wave guide having an electrode centrally located therein, jointly applying an ultrahigh-frequency signal and a Stark modulation voltage to such electrode, and, detecting the resulting modulated radio frequency.

3. A method for analyzing absorption spectra of gases at microwave frequencies below 2000 mc./s. comprising the steps of introducing a gas to be analyzed into a fluid-tight rectangular wave guide having an electrode therein and normally having a cut-off frequency of 2000 mc./s., jointly applying a radio frequency signal from 300 to 2000 mc./s., and applying a square-wave voltage having a frequency of 5000 cycles per second to such electrode, and, detecting the resulting modulated frequency produced in such wave guide.

4. In combination, a rectangular wave-guide absorption cell having an electrode located therein and insulated therefrom, a source of radio-frequency voltage, a source of Stark voltage, and, decoupling means connected to said sources of radio-frequency and Stark voltages for jointly applying said radio-frequency signal and said Stark voltage to the electrode of said cell.

5. The invention as defined in claim 4 wherein said decoupling means comprises an inductance-capacitance network.

6. In combination, a rectangular wave-guide absorption cell having an electrode located therein and insulated therefrom, a gas in said absorption cell, a source of radio frequency voltage, a source of Stark voltage, decoupling means connected to said sources of radio-frequency and Stark voltages for jointly applying said radio frequency and said Stark voltages to the electrode of said cell, and means for detecting the modulated radio-frequency output of said cell.

7. The invention as defined in claim 6 wherein said detecting means comprises a probe element capacitively coupled to said absorption cell.

8. In combination, a rectangular wave-guide absorption cell having an electrode centrally located therein and insulated therefrom, a gas in said absorption cell, a source of radio-frequency voltage, a source of Stark voltage, a decoupling network connected to said sources of radio-frequency and Stark voltages for jointly applying said radio frequency and Stark voltages to the electrode of said cell, and abbreviated wave guide section having the same cross-sectional area of said absorption cell, a spring contact in said abbreviated guide and adapted for direct connection with the electrode of said cell, and detecting means connected to said spring contact.

9. The invention as defined in claim 8 wherein said detecting means comprises a double-tuned circuit connected to said spring contact, the primary of which is series tuned and the secondary of which is parallel tuned.

References Cited in the file of this patent

UNITED STATES PATENTS

| | | |
|---|---|---|
| 2,636,926 | Wilson et al. | Apr. 28, 1953 |
| 2,637,767 | Hershberger | May 5, 1953 |

OTHER REFERENCES

The Review of Scientific Instruments, vol. 23, No. 11, November 1952, page 635—article by Rueger et al.